Jan. 8, 1952     P. L. SPENCER     2,582,174

ELECTRONIC COOKING

Filed Oct. 22, 1949

INVENTOR
PERCY L. SPENCER
BY
ATTORNEY

Patented Jan. 8, 1952

2,582,174

UNITED STATES PATENT OFFICE 2,582,174

ELECTRONIC COOKING

Percy L. Spencer, West Newton, Mass., assignor to Raytheon Manufacturing Company, Newton, Mass., a corporation of Delaware Application October 22, 1949, Serial No. 123,025

6 Claims. (Cl. 99—221)

This application relates to the preparation of food, and more particularly to methods and means whereby a toasted outer surface may be produced upon food bodies which are cooked by microwave energy.

When food bodies are cooked by microwave energy, all parts of the food body are heated uniformly so that both the outside surface and the interior of the food body are cooked to the same degree. This results in the outside of the food body having the same physical appearance as the inside of the food body; for example, a loaf of bread which is white inside will similarly be white outside and be devoid of any crust. Since this product is different in appearance from a normal loaf of bread, there is considerable buyer resistance to this product. Also in the case of meats, for example, the outside surface is browned during normal cooking, thereby imparting a distinctive flavor to the meat.

Applicant has discovered that certain substances may be applied to the outside surface of uncooked food bodies which will create a toasted outer surface on the food body when the food body is cooked by microwave energy.

Figure 1:
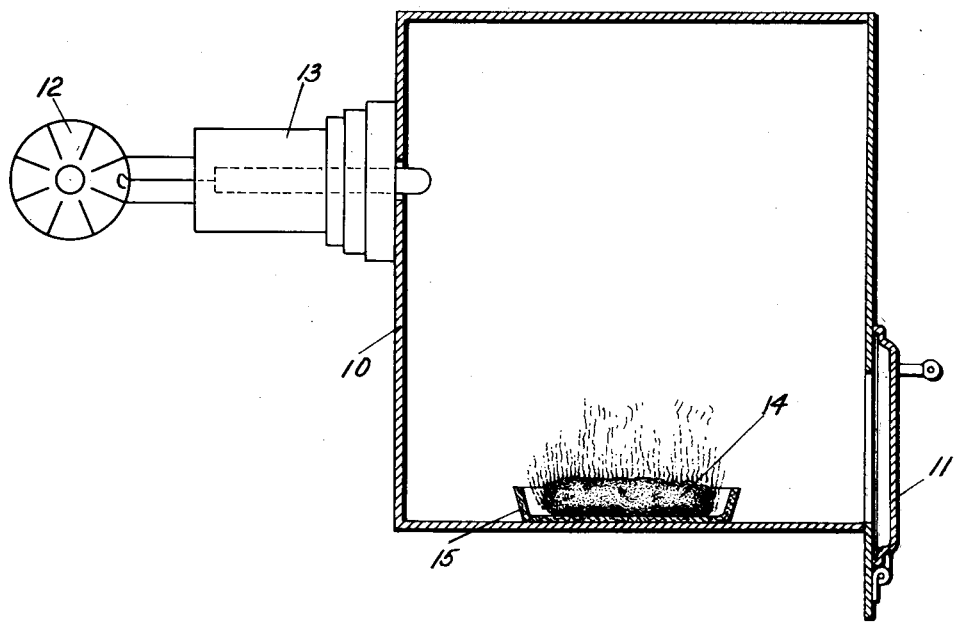

A particular method and means for practicing this invention will now be described in detail, reference being had to the accompanying drawing wherein:

Fig. 1 diagrammatically illustrates an electronic cooker; and

Figure 2:
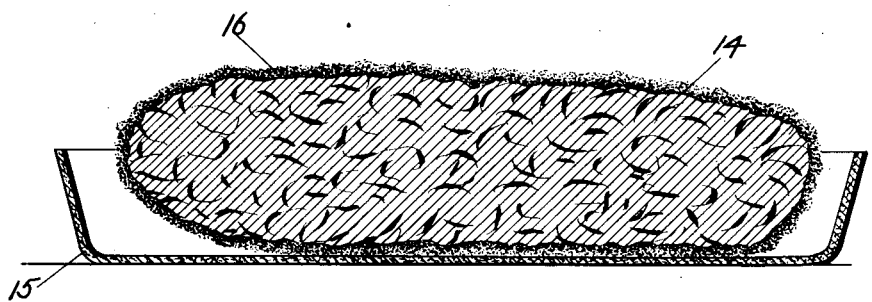

Fig. 2 illustrates a particular food body having a coating thereon.

Referring now to Fig. 1, there is shown an electronic cooker comprising a metallic oven 10 having a door 11 to permit the insertion of food into said oven, and a source of microwave energy, shown here by way of example as a magnetron 12, coupled to said oven through a coaxial coupling arrangement 13. Inside oven 10 there is shown a food body 14 which may be, for example, a hamburger steak resting in a container 15 which may be, for example, a paper plate.

Referring now to Fig. 2, the food body 14 is shown in cross-section. It may be seen that the outside of food body 2 is coated with a substance 16 which may be made of a variety of materials. The main requirement of the coating substance 16 is that it will absorb microwave energy at a greater rate than the food body. Thus when the food body is subjected to the electromagnetic wave energy for a sufficient time to cook the interior of the food body, the surface of the food body, which is coated with the above-mentioned heat-absorbing substance, will be raised to a temperature considerably above the interior of the body. This increased temperature will partially carbonize the surface of the food body and the coating substance to form a toasted surface.

One group of substances which may be used for the coating comprises materials which contain a substantial amount of carbonized material. For example, a coating substance, particularly adapted for use on pastry but not limited thereto, may be made by baking pastry until it is very hard, grinding the baked pastry into fine particles, and either sprinkling the particles through a sieve onto the food body, or mixing the ground particles with a binder, such as water or an edible oil, and applying the mixture to the body in the form of a paste. Similarly a coating may be made for meat bodies by baking a quantity of meat to a semi-charred or crisp state, and then grinding up the meat to fine particles. This substance may be applied by sprinkling through a sieve, or by mixing with a binder to form a paste which is then spread on the meat.

Another type of coating, which may be used, comprises substances having a low carbonizing temperature. In this group there are, for example, chestnut flour, egg mixtures and other substances which contain organic oils and organic salts. These substances, when raised to a temperature sufficient to cook the interior of the food body, become partially carbonized, whereupon they absorb heat at an increased rate and thus produce a toasted surface.

This completes the description of the species of the invention described herein. However, many modifications thereof will be apparent to persons skilled in the art. For example, any edible substance which will absorb energy at a sufficiently greater rate than the food body may be used. Therefore, applicant does not wish to be limited to the particular details of the embodiment of the invention described herein except as defined by the appended claims.

What is claimed is:

1. The method of producing a toasted surface on a food body comprising coating the surface of said body with an edible substance which absorbs microwave energy more readily than said body, and subjecting said body to microwave energy for a sufficient length of time to toast said coating.

2. The method of producing a toasted surface on a food body comprising coating the surface of said body with an edible substance having a substantially lower carbonizing temperature than said body, and subjecting said body to microwave energy for a sufficient length of time to partially carbonize said coating.

3. The method of producing a toasted surface on a food body comprising coating the surface of said body with an edible organic substance having a substantially lower carbonizing temperature than said body, and subjecting said body to microwave energy for a sufficient length of time to partially carbonize said coating.

4. The method of producing a toasted surface on a food body comprising coating the surface of said body with an edible organic substance which absorbs microwave energy more readily than said body, and subjecting said body to microwave energy for a sufficient length of time to toast said coating.

5. The method of producing a toasted surface on a food body comprising coating the surface of said body with an edible substance containing a substantial quantity of free carbon, and subjecting said body to microwave energy for a sufficient length of time to partially carbonize said surface.

6. The method of producing a toasted surface on a food body comprising coating the surface of said body with an edible substance containing a substantial quantity of free carbon, and subjecting said body to microwave energy for a sufficient length of time to cook said food body.

PERCY L. SPENCER.

REFERENCES CITED

The following references are of record in the file of this patent:

UNITED STATES PATENTS

| Number | Name | Date |
| --- | --- | --- |
| 2,193,622 | Coulter | Mar. 12, 1940 |
| 2,340,351 | Wells | Feb. 1, 1944 |
| 2,413,003 | Sherman | Dec. 24, 1946 |
| 2,474,650 | Birdseye | June 28, 1949 |
| 2,480,679 | Spencer | Aug. 30, 1949 |

FOREIGN PATENTS

| Number | Country | Date |
| --- | --- | --- |
| 658 | Great Britain | of 1903 |
| 8,677 | Great Britain | of 1906 |

OTHER REFERENCES

Everybody's Cook Book, Lord (1924), p. 500.
Scientific American, June 1947, p. 254.